US006446083B1

United States Patent
Leight et al.

(10) Patent No.: US 6,446,083 B1
(45) Date of Patent: Sep. 3, 2002

(54) SYSTEM AND METHOD FOR CLASSIFYING MEDIA ITEMS

(75) Inventors: Nathan D. Leight, New York;
Jonathan D. Katz, Sands Point;
Robert C. Plotkin, Dobbs Ferry; David A. Epstein, Ossining, all of NY (US)

(73) Assignee: VastVideo, Inc., Astoria, NY (US)

( * ) Notice: Subject to any disclaimer, the term of this patent is extended or adjusted under 35 U.S.C. 154(b) by 0 days.

(21) Appl. No.: 09/570,569

(22) Filed: May 12, 2000

(51) Int. Cl.[7] .............................................. G06F 17/30
(52) U.S. Cl. ........................... 707/104.1; 707/3; 707/5; 707/102
(58) Field of Search ........................... 707/3, 5, 6, 102, 707/104, 104.1

(56) References Cited

U.S. PATENT DOCUMENTS

| 5,442,784 | A | * | 8/1995 | Powers et al. ............... 707/102 |
| 5,625,767 | A | * | 4/1997 | Bartell et al. ............... 345/440 |
| 5,630,125 | A | * | 5/1997 | Zellweger ................... 707/103 |
| 5,721,910 | A | * | 2/1998 | Unger et al. ................. 707/100 |
| 5,812,134 | A | * | 9/1998 | Pooser et al. ............... 345/356 |
| 5,890,149 | A | * | 3/1999 | Schmonsees ................... 707/3 |
| 6,233,575 | B1 | * | 5/2001 | Agrawal et al. ................ 707/6 |
| 6,336,910 | B1 | * | 1/2002 | Ohta et al. .................. 604/6.13 |
| 6,370,543 | B2 | * | 4/2002 | Hoffert et al. ........... 707/104.1 |

* cited by examiner

Primary Examiner—Jean R. Homere
(74) Attorney, Agent, or Firm—Fleshner & Kim, LLP (57) ABSTRACT

A method and apparatus aids consistent, high-quality input of meta-information associated with items inserted into a database by coupling a hierarchical subject taxonomy, used to definitively assign an element, with sets of attributes appropriate for each category. Each attribute in turn is itself associated with a set of legal values drawn from a universe of appropriately typed values. The method and apparatus can be used to enable a user of a database management system to input or augment a set of semantically relevant and consistent meta-information associated with content in or being placed into the database management system. The content in the database system is placed into one or more of a set of hierarchical taxonomic categories. Zero or more semantically relevant attributes are associated with each taxonomic category. Relevant sets of values for each attribute, drawn from a universe of appropriate values, are associated with each attribute at each level in the taxonomic hierarchy. The placement of an element into a category adds the hierarchical set of attributes associated with that category to those relevant to the element. The value sets associated with those attributes may then be used to select consistent and appropriate meta-information to be associated with the element.

16 Claims, 5 Drawing Sheets

SYSTEM AND METHOD FOR CLASSIFYING MEDIA ITEMS

BACKGROUND OF THE INVENTION

1. Field of the Invention

The present invention generally relates to the area of database management systems with specific applications in content management and the assisted input of meta-information associated with, and often later used for selection and retrieval of, elements placed into a content database.

2. Background Description

Numerous content management systems, many of which are used to store or manage video content, have been built to date. Early systems merely provided the ability to add a short freeform textual description of the content. Other systems provided a series of fixed fields, e.g., subject, date, time, cameraman, etc., into which relevant information was placed. While the format for many of these fields was fixed, others, particularly the subject, were often left as freeform text and subject to the specific subjective whim of the individual entering the information. Yet other systems allow for the association of arbitrary attribute/value pairs. In these systems not only are the values associated with each field again subject to the vagaries of the individual doing the data input but also the actual attributes for which values are entered as well.

Other content management systems, most notably a variety of library management systems, focus on placing items into a taxonomic hierarchy. Generally, these systems suffer from two drawbacks. First, items are placed into a single category in the hierarchical taxonomy, which, while perhaps appropriate for library science, often misses all of the potential uses for a content element. Second, like the more specialized systems described above, they generally have a fixed set of attributes that are used for all categories.

SUMMARY OF THE INVENTION

It is therefore an object of the present invention to provide an improved system and method for classifying media information stored in an database based on content.

It is another object of the present invention to achieve the above object by associating media information with a plurality of levels of a hierarchical taxonomy, which association allows the media information to be simultaneously classified into a variety of subject matter topics based on content.

It is another object of the present invention to allow a user to change the classification of a particular media item and/or the taxonomy structure used to classify that item with ease compared with conventional content management systems.

These and other objects of the present invention are achieved by providing a method for classifying media information using a taxonomy which includes: a hierarchy of nodes each of which corresponds to a category relevant to a topic of interest; one or more attributes related to each of the nodes; and one or more values related to each of the attributes. The method involves obtaining a media item, selecting a node in the taxonomy which relates to content of the media item, identifying at least one attribute related to the selected node, and then presenting for selection a predetermined cluster of values relating to the at least one attribute. The media item being classified may be a video clip, an audio clip, or text. Further, the predetermined cluster of values may be derived from a controlled vocabulary of values which may be modified at the discretion of a user.

After the clusters of values are presented, the method continues by allowing a user to select at least one value of from each of the cluster of values corresponding to the attributes associated with the selected node. The media item is then classified within the taxonomy based on the selected node, the attributes related to the selected node, and the values selected by the user for each of the attributes. This node and its related attributes and values may then be considered as meta-information for enabling selection of the media item by a user at a later date.

Advantageously, the method may be practiced using a graphical user interface which displays all or a portion of the taxonomy. A user then selects a relevant node for the media item by "clicking" on a category or sub-category shown in the displayed taxonomy. Once this selection is made, the attributes corresponding to the selected category are displayed along with the clusters of values relating to the attributes. A user then selects the values from each cluster into which the media item is to be classified. If desired, a media player may be coupled with the graphical user interface to increase the speed and efficiency of the classification method.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The context of a preferred embodiment of the invention is a system that combines media information with commerce and/or advertising information and then streams that combined information to a client via a network. The client may be in any form conventionally known. Examples include a user's computer hardwired to the network, a television receiver interfaced to the network through, for example, a one-way or interactive connection, and a personal digital assistant or other device connected to the network via a wireless link. The network may be a local area network, a wide area network, or a global network such as the Internet.

Figure 1:
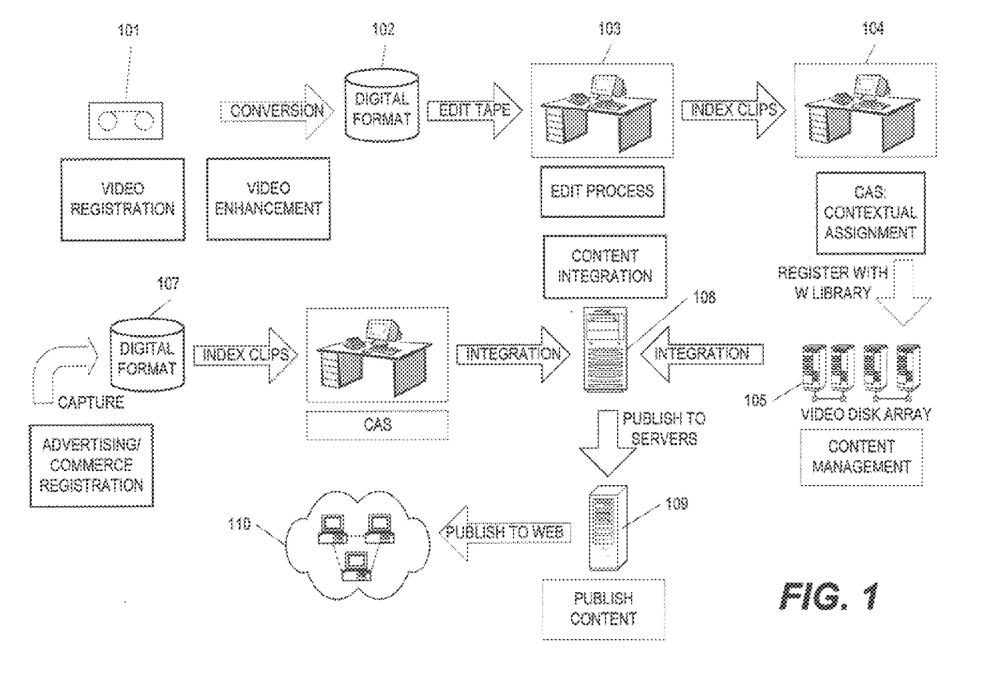
FIG. 1 is a block diagram showing the illustrative use of the present invention in a system that uses of video clips which are integrated with commerce and advertising and then streamed via the Internet to a client.

FIG. 1 shows, in block diagram form, the overall system in which the present invention is preferably implemented.

As shown, media information 101 is acquired from any one of a variety of sources. This media information may include a video clip, an audio clip, and/or textual information. For the sake of illustration, media information 101 will be discussed as being derived from a VHS tape.

Since the VHS tape is in analog format, the information on the tape must first be converted into digital format 102. Once in digital format, the information is edited at a non-linear video editing station 103 to obtain one or more video clips which will eventually be made accessible for streaming or downloading to the client. After editing, the video clips are classified by content in accordance with a taxonomy process 104. The video clips are stored in accordance with their classifications in, for example, a video disk array 105 for later access.

Additional content in the form of commerce and/or advertising information 106 may be integrated or combined with a video clip selected from the video disk array when the clip is delivered to the client. The commerce or advertising information may be acquired and converted into digital format 107. A content integration processor 108 then determines when and with what video clips the commerce and advertising content are integrated. The video clips from the video disk array 105 are selected and integrated with appropriate commerce and advertising information and published to a video server 109 which, in turn, transmits the integrated video content to a client via the network 110.

In operation, when a stimulus (e.g., either a query or the selection of a video clip by a client) is input into the system, meta-information, some of which may be associated with the video clip itself, is used to select commerce and/or advertising information to be delivered with the selected video clip. Additional inputs to the system may include contextual location (e.g., Web page from which the selection occurred) of the user, physical location of the user, time of day, etc. These additional inputs enable not only far more targeted and relevant advertising to be packaged for display with the clip, the underlying mechanism of this linkage also enables commerce opportunities and other relevant media to be incorporated into the same bundle for simultaneous or staggered display. Furthermore, this linkage is performed in such a way that information about the user, his or her physical and contextual locations, and other demographic information, for example, may be used to dynamically derive the elements of the bundle.

The system and method of the present invention is directed to the taxonomy process 104 shown in FIG. 1. This process is based on classifying media items (e.g., video clips, audio clips, text) within a taxonomy constructed from a series of inter-related objects, described as follows:

Categorization—a hierarchical classification of a knowledge space expressed using nodes, including a root node and a plurality of lower-level nodes stemming from the root node. The root node and the lower-level nodes all correspond to categories which relate to a topic of interest. Typical examples of this hierarchy of nodes (or categories) include the Dewey Decimal System and the Library of Congress Catalog. Equally valid hierarchical categorizations include the Yahoo and Excite search engine information hierarchies.

Attributes—additional pieces of information (e.g,. words) that are semantically relevant to the categories (nodes) in the categorization, e.g., "players", "coaches," and "famous fans" are all potentially relevant attributes for the category "basketball". Each category may have zero or more attributes associated with it.

Values—specific pieces of information that are associated with an attribute. Following from the example above, the specific values for the attribute "coaches" may be "Larry Bird," "Jeff Van Gundy," and "Pat Riley."

Attribute Type—an abstract collection of a series of values of a specific kind; e.g., people, places, things, actions, etc.

Controlled Vocabulary—a universe of potential values for an attribute type; e.g., list of all people (proper names) to be referenced. The attributes, thus, may be selected from the controlled vocabulary.

Cluster—a subset of a controlled vocabulary that may be associated, as the list of acceptable values, for one or more attributes belonging to one or more categories.

Cluster ID—a named handle for, or reference to, a cluster.

In accordance with the present invention, media items for inclusion in the database are classified into one or more categories of the taxonomy categorization, either via a direct selection mechanism or through hierarchical traversals of a representation (and preferably a visual representation) of the categorization. Traversal of the categorization or the placement of a media item into a category associates all of the attributes related to that category with the media item, as well as any values or clusters of values associated with each of the attributes. The attributes and their linked clusters are then used to derive an interface through which values in each cluster may be selected as the value(s) into which the media item is to be classified for the given attribute. This attribute and value inclusion process may occur either during traversal of the categorization or subsequent to the final selection of categories relevant to the media item.

Figure 2:
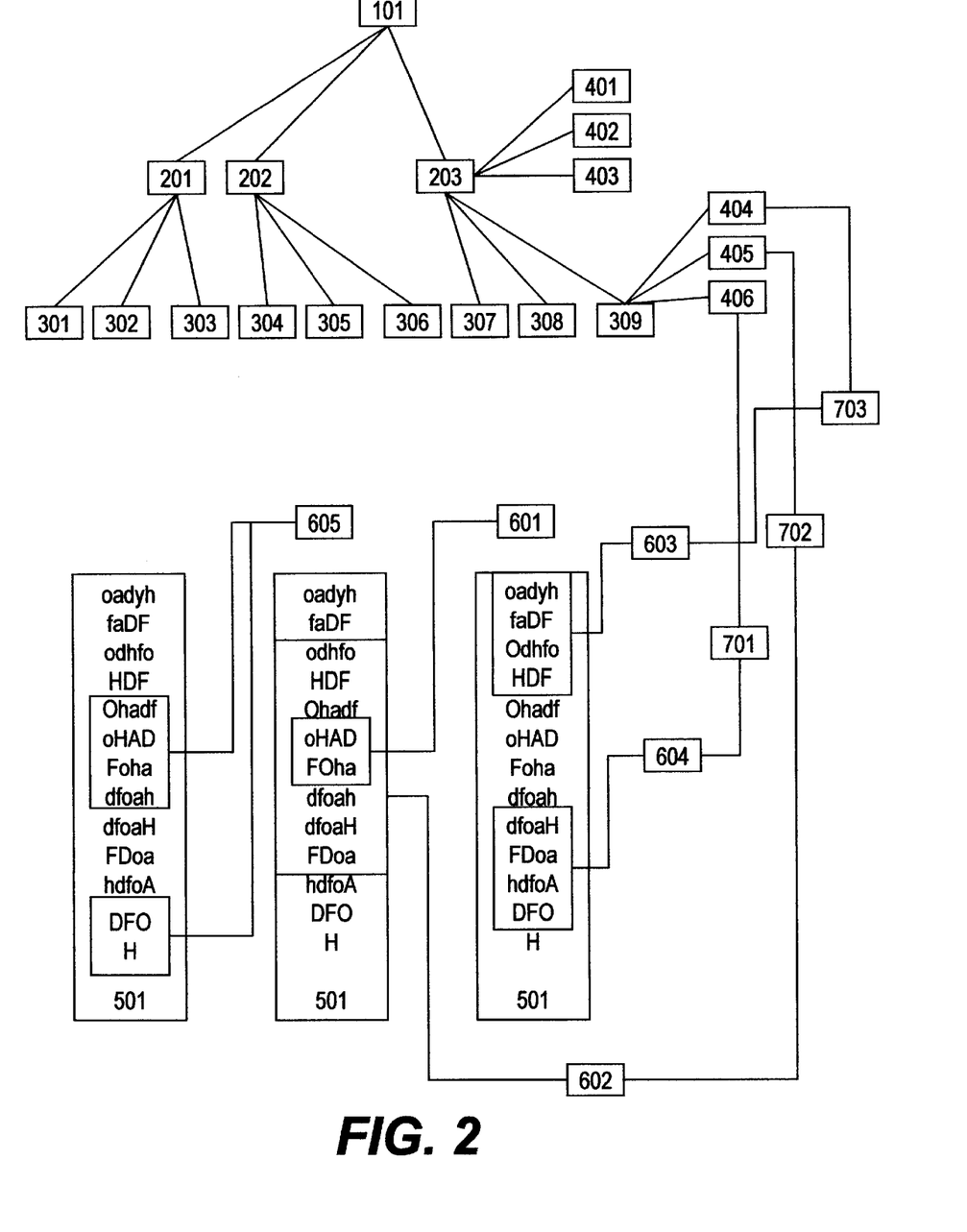
FIG. 2 is a diagram showing an exemplary structure of a taxonomy into which the present invention classifies media information.

FIG. 2 is a diagram of the taxonomy used in accordance with the present invention. In this taxonomy, items 101 to 309 represent a hierarchical categorization. Item 101 represents the root node of the categorization, items 201, 202 and 203 represent categories at a second level of the categorization, and items 301 to 309 represent categories at a third level of the categorization. Categories which are children of a higher-level category (e.g. the relationship between items 301, 302 and 303 and item 201) represent more specialized (often referred to as sub-) categories.

Items 401 to 406 illustrate a relationship of attributes to categories in the categorization, with items 404, 405 and 406 being attributes specifically associated with category 309.

Items 501, 502 and 503 illustrate a set of controlled vocabularies, while items 601 to 605 illustrate several different clusters. In the example illustrated, items 603 and 604 are disjoint clusters associated with attributes 404 and 406, respectively; item 602 is a cluster associated with attribute 405; item 601 is a cluster that is a subset of cluster 602 which may be associated with an attribute; and item 605 is a cluster consisting of non-contiguous elements in controlled vocabulary 501 and which may be associated with an attribute.

Items 701, 702, and 703 illustrate cluster identifications (IDs) for clusters 604, 602, and 603.

A user of the database management system in the taxonomy process 104 shown in FIG. 1 is able to modify (i.e., input, delete, or augment) a set of semantically relevant and consistent meta-information associated with content in or being placed into the database management system. The content in the database system is placed into one or more of a set of hierarchical taxonomic categories as generally illustrated in FIG. 2. Zero or more semantically relevant attributes are associated with each taxonomic category. Relevant sets of values for each attribute, drawn from a universe of appropriate values (i.e., controlled vocabularies), are associated with each attribute at each level in the taxonomic hierarchy. Placement of a media item into a category associates the hierarchical set of attributes associated with that category to the media item. The cluster(s) of values associated with those attributes may then be used to select consistent and appropriate meta-information to be associated with the media item. In this way, the present invention advantageously couples a hierarchical taxonomy, used to definitively classify a media item, with attributes appropriate for each category, and then with predetermined cluster(s) of zero or more values (derived from respective controlled vocabularies) associated with each attribute.

Figure 3:
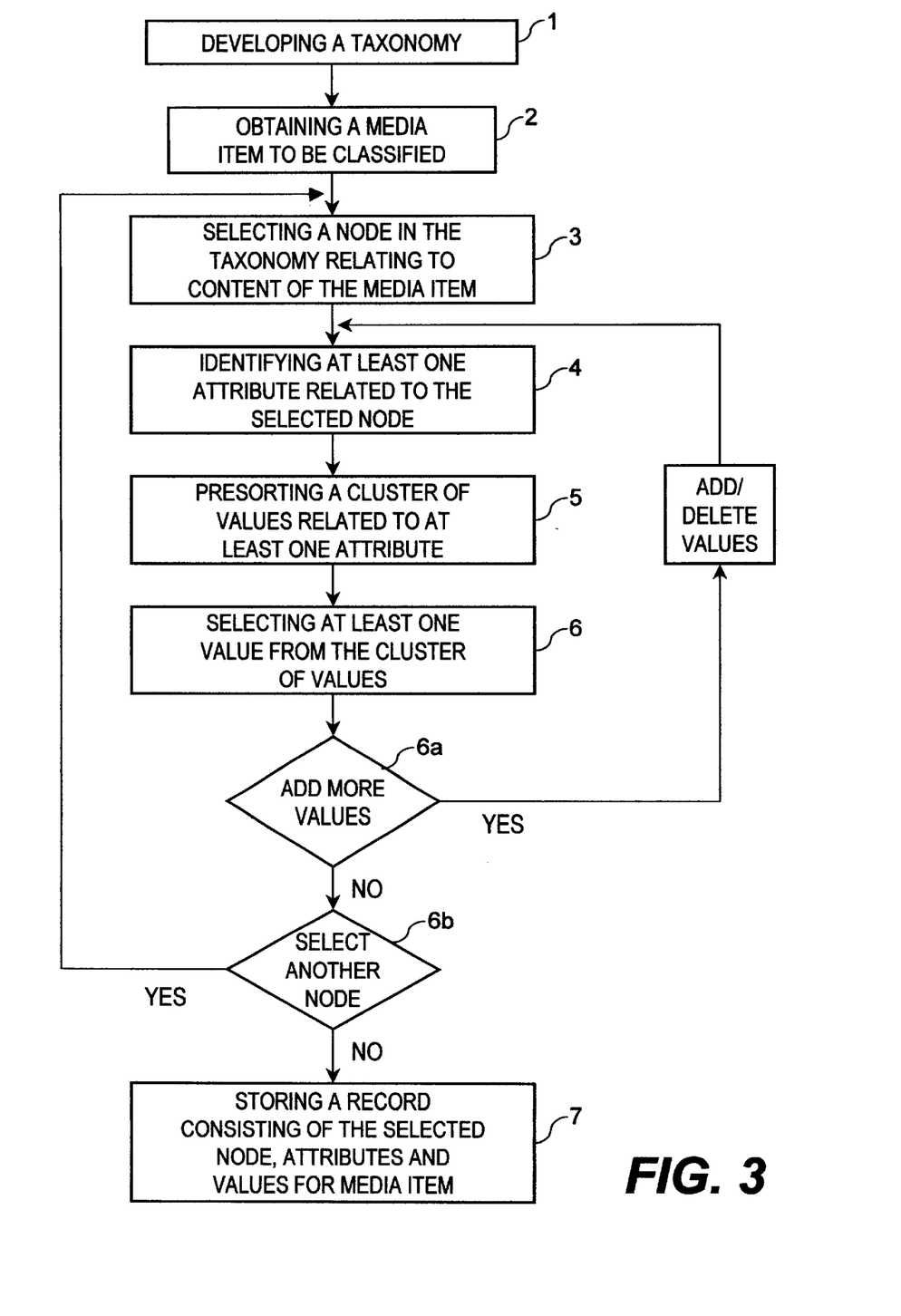
FIG. 3 is a flow diagram showing steps included in a preferred embodiment of the method of the present invention for classifying media information.

FIG. 3 is a flow diagram showing steps included in a preferred embodiment of the method of the present invention. The first step of the method includes developing a taxonomy, such as shown in FIG. 2, which includes a hierarchy of nodes each of which corresponds to a category relevant to a topic of interest. The taxonomy also includes one or more attributes related to each of the nodes, and one or more values related to each of the attributes. (Block 1).

The second step of the method includes obtaining a media item to be classified. The media item may be an video clip, and audio clip, or text. (Block 2). If a video clip, the clip may be derived from a VHS tape, as previously indicated, or any one of a variety of other sources including downloaded clips from a network (e.g,. the Internet) which are already in an appropriate digital format. The clips may also be derived from a DVD or other conventional medium used for storing media information.

The third step includes selecting a node in the taxonomy which relates to the subject matter content of the media item. (Block 3). This selecting step may advantageously be performed by displaying a visual representation of all or a portion of the taxonomy on a computer screen and then, for example, pointing-and-clicking a mouse cursor on the desired node of the taxonomy which corresponds to a subject matter category relevant to the content of the media item. The selection of this node may be performed in a single step, for example, by directly selecting the relevant node in the visually displayed portion of the taxonomy.

Alternatively, the selection may be made in a series of steps which begins with a user selecting (e.g., pointing-and-clicking on) a higher-level node in the taxonomy. This may result in the display of lower-level nodes corresponding to sub-categories of the higher-level node. The user may then select one of the lower-level node as the node in the taxonomy into which the media item is to be classified.

The fourth step includes identifying at least one attribute related to the node selected in the third step. (Block 4). Preferably, the selection of a node automatically causes the related attributes in the taxonomy to be presented to the user. This presentation step may include displaying the attributes on the computer screen.

The fifth step includes presenting at least one predetermined cluster of values for each of the attributes identified (or displayed) in the fourth step. (Block 5). Preferably, the clusters of values are displayed on the computer screen in association with respective ones of the attributes. As previously discussed, each cluster of values may be preselected from a controlled vocabulary, or universe, of values such as shown by 501, 502, and 503 in FIG. 2.

The sixth step includes selecting at least one value of the cluster of values presented in the fifth step. (Block 6). If the clusters are displayed on the display screen, the selection may be performed by pointing-and-clicking on the desired value or values in each cluster into which the user desires to classify the media item. To aid the user, the selected values may be displayed in a specially dedicated window.

The seventh step includes classifying the media item within the taxonomy by storing a record which includes the node selected in the third step, the attribute or attributes related to the selected node, and the value or values selected from the clusters of values related to the attributes. (Block 7). This node and its related attributes and values may then be considered as meta-information for enabling selection of the media item by a user at a later date. The meta-Information may be stored with media item in the database system for this later use.

Figure 4:
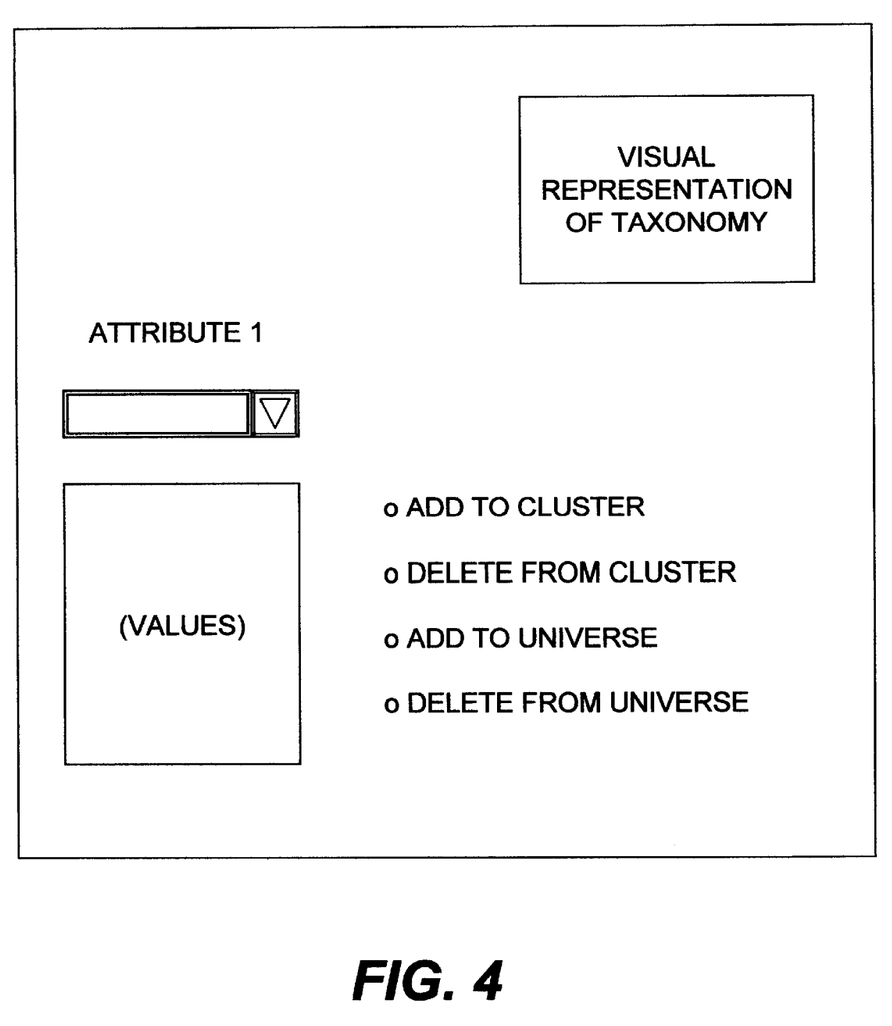
FIG. 4 is an illustrative computer screen showing one way in which values may be added or deleted from a cluster of values corresponding to an attribute shown in the taxonomy used in accordance with the present invention, and/or added or deleted to one or more controlled vocabularies from which the clusters of values in the taxonomy are derived.

Optional steps of the method include prompting and/or providing a user with an opportunity to add or delete values either to the one or more attributes corresponding to the selected node or to the one or more controlled vocabularies from which the cluster of values for each attribute are derived. (Block 6a). This modifying step may be performed by a user using a graphical user interface. For example, as shown in FIG. 4, the computer screen may include a window into which a user may type a word. Additional windows, or areas, may then be associated with the window which, when clicked, cause the word typed in the window to be added or deleted from the cluster corresponding to an attribute, or added to the controlled vocabulary (or universe) of values from which the cluster is derived. Once values have been added, or deleted, the method may continue by performing the steps in Blocks 4 through 6 previously described.

Another optional step includes prompting and/or providing the user with an opportunity to select another node into which the media item is to be classified. (Block 6b). Attributes and associated values related to the other node may then be selected in accordance with the steps in Blocks 3 through 6. Through the optional step in Block 6b, the method of the present invention therefore allows a single media item to have numerous classifications within the database system.

Another optional step includes displaying a media player on the computer screen in association with one or more of the displayed portion of the taxonomy, the display attributes, and the displayed clusters of values. By viewing a video clip on the media player, a user can quickly and efficiently determine the content of the video clip and classify it on that basis in accordance with the steps of the method of the present invention.

Another optional step includes deriving the words in the controlled vocabularies in a memory device of the database system and/or in a memory device external to the database system, such as in a remote network server or other database.

Figure 5:
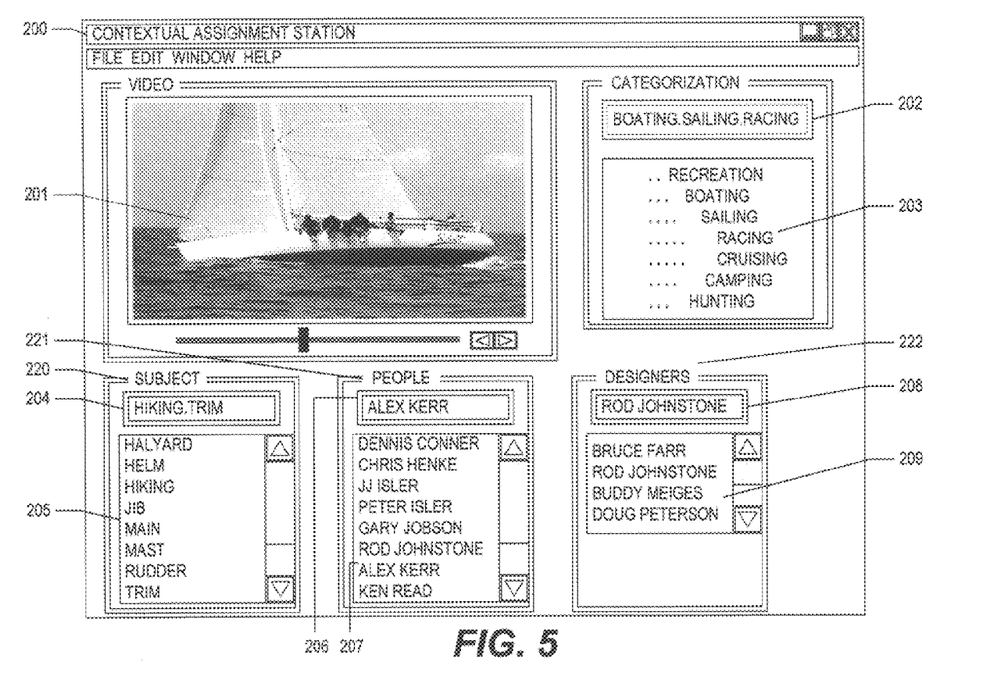
FIG. 5 is a diagram of an exemplary screen on a client machine showing a streaming video clip in a window and additional topic windows used for classifying the video clip into a taxonomy in accordance with the present invention.

FIG. 5 provides an illustration of how a video clip may be classified in accordance with the present invention. In this example, it is assumed that a user on a client machine is visiting a Web site that sells gear and clothing for active outdoor sports. The Web page may include a scene that allows the user to select a video clip, which, for example, may be the sailing video clip represented by the sailing scene 201 in computer screen 200. If desired, the sailing scene may be part of a media player which plays the entire clip for the user.

In addition to the video clip, computer screen 200 also includes a visual representation 203 of a portion of the system taxonomy which relates to the node "boating." As shown, one of the sub-categories (or lower-level nodes) of "boating" is "sailing," which has the sub-category of "racing." The "racing" sub-category (or node) may be selected, for example, by a user clicking on the word "racing" in the visual representation 203 of the taxonomy.

Once the "racing" node has been selected, the attributes of "Subject" 220, "People" 221, and "Designers" 222 are displayed in association with the taxonomy 203. Associated with the attributes on the screen are scrollable windows, each containing a cluster of values corresponding to the attributes. For example, the cluster of values 205 is displayed in association with the "Subject" attribute, the cluster of values 207 is displayed in association with the "People" attribute, and the cluster of values 209 is displayed in association with the "Designers" attribute.

Another set of windows, 204, 206, and 208, are also displayed with the attributes. Window 204 provides a list of values from cluster 205 selected by the user for the "Subject" attribute. Similarly, window 206 provides a list of values from cluster 207 selected by the user for the "People" attribute, and window 208 provides a list of values from cluster 209 selected by the user for the "Designers" attribute. As previously indicated, at the discretion of the user, none or all of the values in each cluster may be selected for the attributes. In the example of FIG. 5, the user has selected the values of "hiking" and "trim" for the "Subject" attribute, the value "Alex Kerr" for the "People" attribute, and the value "Rod Johnstone" for the "Designers" attribute. As one skilled in the art can appreciate, the cluster of values displayed for each attribute may not be mutually exclusive if the attributes are sufficiently related in subject matter. Further, while only three clusters are shown, those skilled in the art can appreciate that any number of clusters may be displayed.

In summary, the system and method of the present invention classifies media information using a taxonomy categorization formed from a series of software objects, including nodes, attributes, and clusters of values. If desired, this representation of the categorization may be derived from a series of database tables. A visual representation of the categorization, preferably representing at least the currently active portion of the tree structure, is then made available on a display device. The user interacts with the visual representation through some navigational pointing capability, such as a mouse.

As the user selects a category from the taxonomy and then the attributes associated with that category are displayed along with an associated cluster of values (if any), as well as all of those belonging to its ancestors are identified via a process of tracing the links in the categorization, and those not previously identified are included in a list of attributes to be associated with the input element being inserted into the categorization. If categories are deselected, all attributes and associated clusters that are unique to that category are removed from the list.

The list of attributes and clusters is read by an interpreter, either dynamically or as a post-process to the selection of categories, and translated into a representation which identifies the attribute name and the set of acceptable values drawn from the cluster. A preferred embodiment of this output consists of a window, placed upon the display device containing a number of columns, one of which contains the names of the attributes and another of which contains a series of drop-down selection boxes, pre-populated with the contents of the clusters of values associated with each attribute.

An additional portion to the generated interface may also provide a set of additional functions allowing values for an attribute to be selected from the other values in the controlled vocabulary from which the cluster is drawn. It may also allow new values to be added by the user that may be either included into the cluster or placed into the controlled vocabulary.

While the invention has been described in terms of preferred embodiments in the context of a preferred implementation, those skilled in the art will recognize that the invention can be practiced with modification within the spirit and scope of the appended claims. Specifically, it will be understood that while the preferred embodiment contemplates the categorization of video clips, the categorization method of the invention can be used for any media which does not admit of ready categorization by known tools.

Having thus described our invention, what we claim as new and desire to secure by Letters Patent is as follows:

1. A method for classifying media information in a database system, said method comprising:
    (a) developing a taxonomy which includes:
        (i) a hierarchy of nodes each of which corresponds to a category relevant to a topic of interest,
        (ii) one or more attributes related to each of said nodes, and
        (iii) one or more values relate to each of said attributes;
    (b) obtaining a video clip;
    (c) selecting a node in the taxonomy which relates to content of the video clip;
    (d) identifying at least one attribute related to the node selected in step (c);
    (e) presenting for selection a predetermined cluster of values relating to the at least one attribute identified in step (d), said cluster of values derived from a controlled vocabulary of values;
    (f) selecting at least one value from said predetermined cluster of values; and
    (g) classifying the media item within the taxonomy based on the node selected in step (c), the at least one attribute identified in step (d), and the at least one value selected in step (f),
    wherein said method further comprises:
        displaying at least a portion of the taxonomy on a computer screen, said portion of the taxonomy including the node selected in step (c), and
        wherein step (c) includes selecting the node from the displayed portion of the taxonomy with a cursor controlled by a user input device.

2. The method of claim 1, wherein step (b) includes accessing said video clip from said database system or from a source external to said database system.

3. The method of claim 1, wherein step (c) includes:
    selecting a higher-level node in the displayed portion of the taxonomy; and
    selecting a displayed lower-level node related to the higher-level node, said lower-level node being the node in the taxonomy which is classified with the video clip in step (g).

4. The method of claim 1, further comprising:
    displaying the at least one attribute identified in step (d).

5. The method of claim 4, wherein step (e) includes displaying said predetermined cluster of values relating to the at least one attribute identified in step (d), and
    wherein step (f) includes selecting the at least one value from said predetermined cluster of values with said cursor controlled by the user input device.

6. The method of 5, wherein step (f) includes selecting a plurality of values from said predetermined cluster of values with said cursor.

7. The method of claim 4, further comprising:
    displaying a plurality of attributes related to the node selected in step (c);
    displaying a predetermined cluster of values for each of the plurality of attributes related to the node selected in step (c); and selecting at least one value from the predetermined cluster of values displayed for each of the plurality of attributes related to the selected node.

8. The method of claim 5, further comprising:

displaying a media player on the computer screen, and wherein step (c) is performed after a user views the content of the video clip on the media player.

9. The method of claim 1, wherein words in said controlled vocabulary are derived from at least one of a memory device of said database system and a memory device stored external to said database system.

10. The method of claim 1, further comprising:

modifying said controlled vocabulary by adding or deleting a value from said controlled vocabulary, said modifying step being performed by a user identifying the value to be added or deleted using a graphical user interface.

11. The method of claim 10, further comprising:

adding or deleting the value from said predetermined cluster of values.

12. A system for classifying media information in a database system, said database system including a taxonomy which includes (i) a hierarchy of nodes each of which corresponds to a category relevant to a topic of interest, (ii) one or more attributes related to each of said nodes, and (iii) one or more values related to each of said attributes, said system comprising:

means for obtaining a video clip;

a graphical user interface for displaying at least a portion of the taxonomy on a computer screen, said graphical user interface including:

(a) first selecting means for selecting a node in the displayed portion of the taxonomy which relates to content of the video clip, (b) means for identifying at least one attribute related to the node selected by the selecting means, (c) means for presenting for selection a predetermined cluster of values relating to the at least one attribute identified by the identifying means, said cluster of values derived from a controlled vocabulary of values, and (d) second selecting means for selecting at least one value from said predetermined cluster of values; and means for storing as a classification for the video clip the node selected by the first selecting means, the at least one attribute identified by the identifying means, and the at least one value selected by the second selecting means.

13. The method of claim 1, further comprising:

associating commerce/advertising information with at least one of the node selected in step (c), the at least one attribute identified in step (d), and the at least one value selected in step (f).

14. The method of claim 13, wherein the following steps are performed when the video clip is selected for viewing:

detecting meta-information indicative of the classification in step (g); and outputting the video clip with said commerce/advertising information for viewing.

15. The method of claim 14, wherein the video clip is selected for viewing on an internet website, and where the video clip and said commerce/advertising information are output to the website for viewing.

16. The method of claim 1, further comprising:

outputting the video clip with commerce/advertising information, said commerce/advertising information being selected based on one of a time of day, a contextual location from which the media item was requested by a user, and a physical location of said user.

* * * * *